H. P. CURTIS.
POWER TRANSMISSION APPARATUS.
APPLICATION FILED OCT. 13, 1915.
1,229,416.
Patented June 12, 1917.
2 SHEETS—SHEET 1.
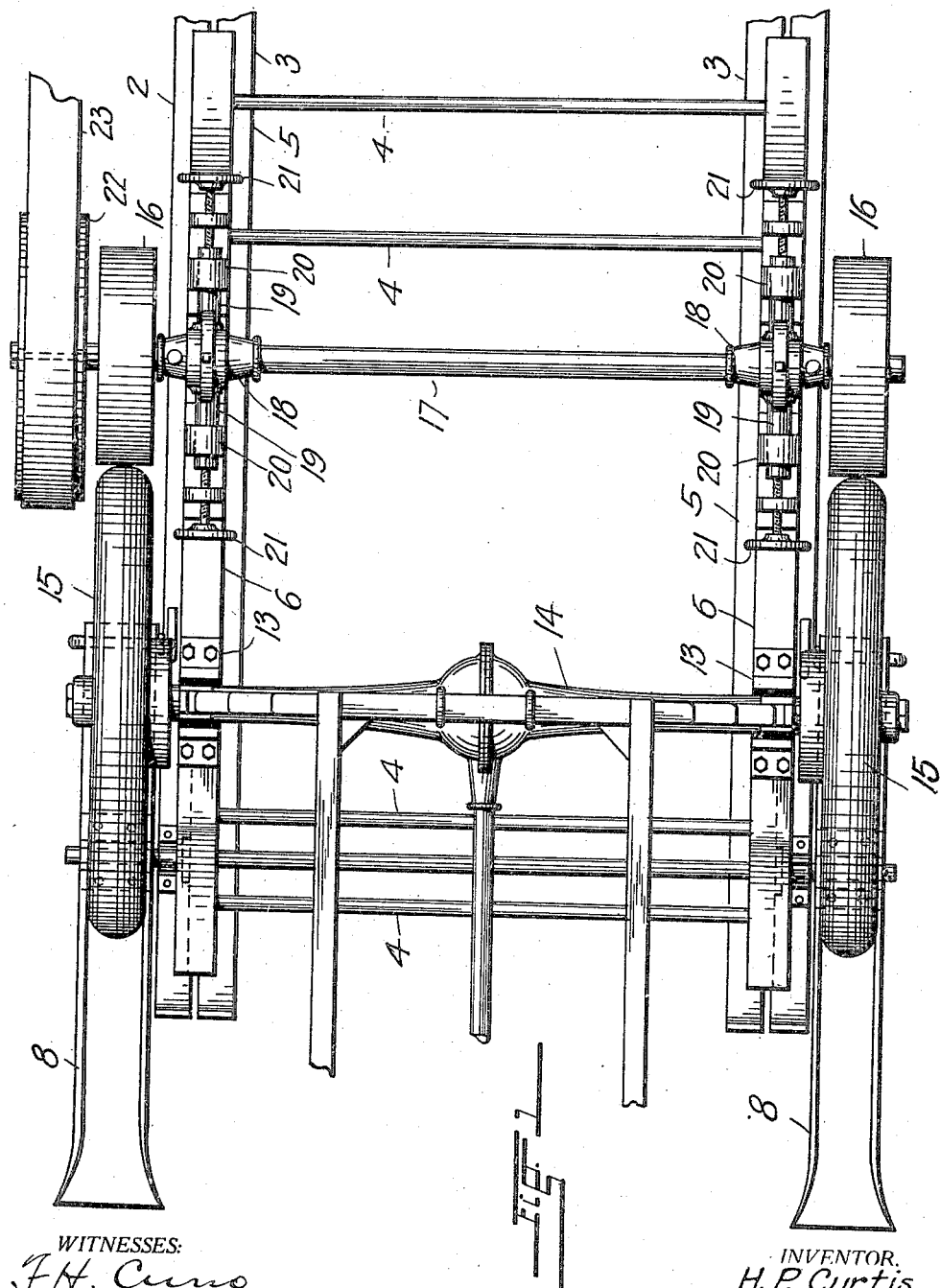
WITNESSES:
INVENTOR.
H. P. Curtis.
BY
ATTORNEY.

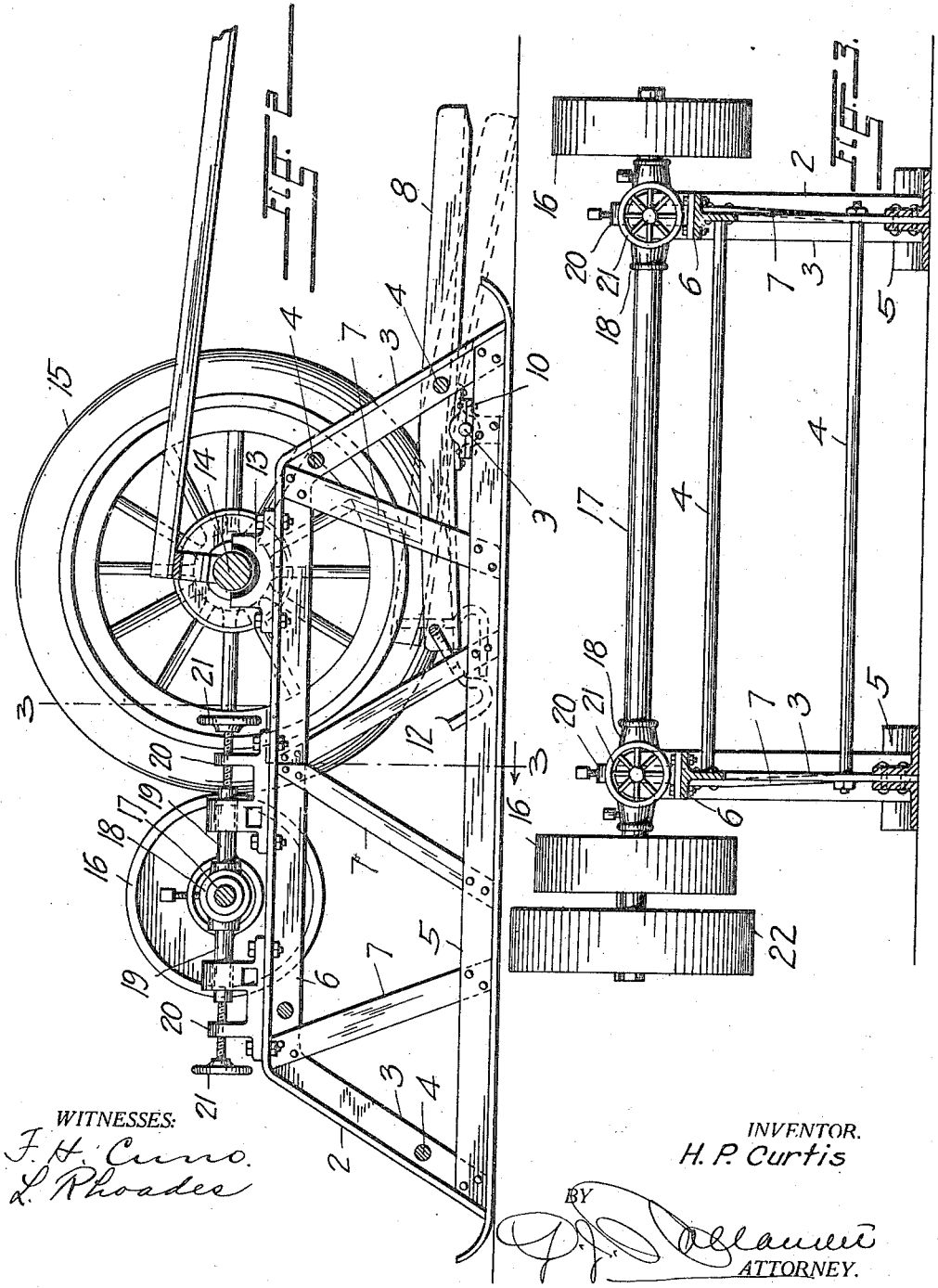

UNITED STATES PATENT OFFICE.

HOMER P. CURTIS, OF DENVER, COLORADO, ASSIGNOR TO AUTO POWER GENERATOR & APPLIANCE CO., A CORPORATION OF COLORADO.

POWER-TRANSMISSION APPARATUS.

1,229,416. Specification of Letters Patent. Patented June 12, 1917.

Application filed October 13, 1915. Serial No. 55,646.

*To all whom it may concern:*

Be it known that I, HOMER P. CURTIS, a citizen of the United States, residing at Denver, in the county of Denver and State of Colorado, have invented certain new and useful Improvements in Power-Transmission Apparatus, of which the following is a specification.

This invention relates to power transmitting apparatus designed for the operation of machine-tools and other mechanical devices by power generated by the engine of a motor driven vehicle, and its primary object resides in providing a mechanism of simple construction which includes in combination with a rotary power transmitting element, simple means for establishing the operative connection thereof with the driving wheel of a motor vehicle.
With the above object in view my transmission apparatus comprises a transportable supporting structure upon which a shaft is rotatably mounted in adjustable boxes. A normally inclined, pivoted track effects the ascent of the rear wheels of a vehicle driven thereonto to a position in which their relatively stationary axle rests in seats on the supporting structure.

With their axle thus supported, the vehicle wheels free for idle rotation, peripherally engage a pair of friction wheels on the shaft of the transmission mechanism and thereby impart a rotary motion to the same, which through the medium of a belt is transmitted to a machine-tool or other mechanically operated device.

An embodiment of my invention thus briefly described is shown in the accompanying drawings in the various views of which like parts are similarly designated, and in which, Figure 1 is a plan view of my improved transmission apparatus and the rear axle and driving wheels of a motor vehicle in its operative position with relation thereto, Fig. 2, a side elevation of the construction shown in Fig. 1, and, Fig. 3, a transverse section taken along the line 3—3, Fig. 2.
Referring more specifically to the drawings, the reference character 2 designates a supporting structure preferably composed of structural iron and including two parallel side members 3 which are connected by a number of stay-bolts 4.

Each of the members of the structure comprises a runner 5 composed of connected bars of angle section between which are secured the ends of the angularly bent legs of a T-shaped rail 6.

The rails of the side members are furthermore connected with the respective runners by a plurality of braces 7, and the runners are curved upwardly at their extremities to facilitate the sliding motion of the structure along a surface upon which it stands.

The track along which the wheels of the motor vehicle ascend to their operative position with relation to the motion transmission element of the apparatus, consists of two parallel, channeled rails 8 which are pivotally mounted upon the ends of a shaft 9 secured transversely of the supporting structure in boxes 10 on the runners 5.

The ends of the shaft project beyond the side members of the structure and the rails of the track are loosely mounted upon said ends so that they can be readily removed or adjusted to a gage conforming with that of the wheels of a vehicle moving onto the track.

The rails are pivoted out of center at points at which they are bent longitudinally into sections of unequal lengths, the outer ones of which normally rest at their ends upon the surface upon which the structure stands, to provide an inclined track for the ascent of the wheels of a vehicle driven thereonto.

The rails are provided at the ends of their inner shorter sections with pivotally suspended stops 12 which when the vehicle wheels move across the pivotal axis of the track from the outer longer sections of the rails onto the inner shorter sections of the same, limit the consequent movement of the rails about their axes of oscillation by engaging the surface upon which the apparatus is supported.

When by the weight of the vehicle upon the inner sections of the rails the latter have been moved about their pivots and are supported upon the stops 12, the axle 14 of the vehicle wheels 15 is positioned above a pair of seats 13 secured upon the rails of the supporting structure, and when the stops are subsequently displaced by striking them with the foot or with a suitable tool, the vehicle moves downwardly with the unsupported rails until the axle is positioned in the seats 13.

When in this position, the wheels 15 engage peripherally with a pair of friction wheels 16 on a shaft 17 which is rotatably mounted upon the supporting structure in adjustable boxes 18. The boxes have laterally projecting arms 19 by means of which they are mounted in chairs 20 bolted to the rails of the supporting structure.

The arms of the boxes are slidingly fitted in openings in the respective chairs and abut at their ends against adjoining screws 21 by means of which the position of the boxes may be varied in the horizontal plane of their alined axes.

The shaft carries a pulley or belt wheel 22 which through the intermediary of a belt 23 transmits the rotary motion thereof to a machine-tool or other mechanically operated device.

In the operation of my invention a motor vehicle is driven rearwardly onto the inclined outer portion of the track along which its driving rear wheels ascend until they move across the axis of oscillation of the rails when by depression of the inner sections of the same they assume a position in which their axle is above the concave seats.

By removing the pivoted stops upon which the track is now supported, in the manner hereinbefore described, the axle is compelled to descend into the seat in which it is supported while the wheels, now running idly, engage the friction wheels and thereby impart a rotary motion to the shaft which through the intermediary of the belt wheel is transmitted to the machine-tool or other mechanical device with which it is connected by the belt.

It will be seen that by manipulation of the screws on the chairs the position of the shaft bearings may be readily adjusted either to correct their alinement or to vary the position of the shaft so as to insure the proper contact of the friction wheels with the wheels of the vehicle whose axle rests in the seats on the supporting structure, and that the rails of the track which are slidingly supported upon the ends of the shaft 9 are easily removed and adjusted to conform with the gage of the vehicle wheels.

While I have shown and described the transmission apparatus in the best and simplest form at present known to me, it will be understood that variations in the construction and arrangement of its parts may be resorted to within the spirit of my invention as set forth in the following claims:

1. Power transmission apparatus comprising in combination with a support, a seat for an axle of a motor-vehicle, a pivoted track for guiding a set of wheels of a motor vehicle driven thereonto, to a position in which their axle is above the seat, a stop which normally obstructs a pivotal movement of the track by the weight of the vehicle, and which is removable to permit of a downward movement of the track whereby the axle of the vehicle wheels supported thereon is permitted to move into the seat, a rotary friction element engaging a vehicle wheel on an axle occupying the seat, and motion transmission means in operative connection with said element.

2. A power transmission apparatus comprising in combination with a support, a normally slanting track extending in opposite directions from a pivotal axis about which it has a movement, a seat for an axle of a motor-vehicle, on the support above the normally uppermost portion of said track at one side of its pivotal axis, a rotary friction-element mounted on the support and adapted to engage a vehicle-wheel on an axle occupying said seat, and motion-transmission means in operative connection with said element.

3. A power transmission apparatus comprising in combination with a support, a normally slanting track extending in opposite directions from a pivotal axis about which it has a movement and composed of independently movable rails, a seat for an axle of a motor-vehicle, on the support above the normally uppermost portion of said track at one side of its pivotal axis, a rotary friction-element mounted on the support and adapted to engage a vehicle-wheel on an axle occupying said seat, and motion transmission means in operative connection with said element.

4. A power-transmission apparatus comprising in combination with a support, a normally slanting track extending in opposite directions from a pivotal axis about which it has a movement, and composed of rails which are laterally adjustable to vary the gage of the track, a seat for an axle of a motor-vehicle, on the support above the normally uppermost portion of said track at one side of its pivotal axis, a rotary friction-element mounted on the support and adapted to engage a vehicle wheel on an axle occupying said seat, and motion-transmission means in operative connection with said element.

5. A power-transmission apparatus comprising a supporting structure including two connected side-members, a normally slanting track extending in opposite directions from a pivotal axis about which it has a movement, and composed of two rails disposed exteriorly of said side-members, seats for an axle of a motor-vehicle, on said side-members above the normally uppermost portion of the track at one side of its pivotal axis, a rotary friction-element on the side-members, for engagement with the wheels on an axle occupying said seats, and motion-transmission means in operative connection with said element.

In testimony whereof I have affixed my signature in presence of two witnesses.

HOMER P. CURTIS.

Witnesses:
G. J. ROLLANDET,
L. RHOADES.

Copies of this patent may be obtained for five cents each, by addressing the "Commissioner of Patents, Washington, D. C."